United States Patent [19]

Steinberger et al.

[11] Patent Number: 4,560,179
[45] Date of Patent: Dec. 24, 1985

[54] CHUCK

[75] Inventors: Josef Steinberger, Düsseldorf; Wilhelm Müller, Hilden, both of Fed. Rep. of Germany

[73] Assignee: Paul Forkardt GmbH & Co. KG, Düsseldorf, Fed. Rep. of Germany

[21] Appl. No.: 423,891

[22] Filed: Sep. 27, 1982

[30] Foreign Application Priority Data

Oct. 20, 1981 [DE] Fed. Rep. of Germany ... 8130683[U]

[51] Int. Cl.[4] .......................................... B23B 31/16
[52] U.S. Cl. ...................................... 279/15; 279/123
[58] Field of Search .................... 279/1 S, 1 ME, 123, 279/110, 111, 114, 115, 116, 119, 120; 82/2 D, 40 R; 409/167, 221, 903; 269/63

[56] References Cited

U.S. PATENT DOCUMENTS

| 6,046 | 1/1849 | Grant | 279/118 |
|---|---|---|---|
| 437,284 | 9/1890 | Budlong | 409/167 X |
| 1,634,396 | 7/1927 | Cole | 82/40 R |
| 1,685,572 | 9/1928 | Onsrud | 409/903 X |
| 2,254,006 | 9/1950 | Capellazzi | 279/110 |
| 3,145,459 | 8/1964 | Shittman | 279/110 X |
| 3,413,010 | 11/1968 | Buck | 279/123 X |
| 3,542,386 | 11/1970 | Becker | 279/121 |
| 3,771,804 | 11/1973 | Platt | 279/121 |
| 3,814,451 | 6/1974 | Röhm | 279/121 |

FOREIGN PATENT DOCUMENTS

| 2052037 | 4/1972 | Fed. Rep. of Germany . |
| 7907323 | 6/1979 | Fed. Rep. of Germany . |
| 523062 | 8/1921 | France ............ 279/112 |
| 311887 | 2/1956 | Switzerland . |

Primary Examiner—Z. R. Bilinsky
Attorney, Agent, or Firm—Martin A. Farber

[57] ABSTRACT

A chuck with T-slots to receive slot blocks for the attachment of stops or rests on the chuck body or on clamping jaws guided for radial movement within the chuck body by at least one attachment screw which engages into a slot block. In order to prevent throwing off of the clamping jaws even if the attachment screws are not properly tightened, the T-slot opens at its radially inward end into a continuous bore having a diameter corresponding to the width of the slot at the base of the slot and at least the base of the slot terminates at a radial distance from the outer periphery of the chuck body at the radially outward end of the slot or the base of the slot is inclined away from the face of the chuck in a direction toward the outer periphery.

2 Claims, 4 Drawing Figures

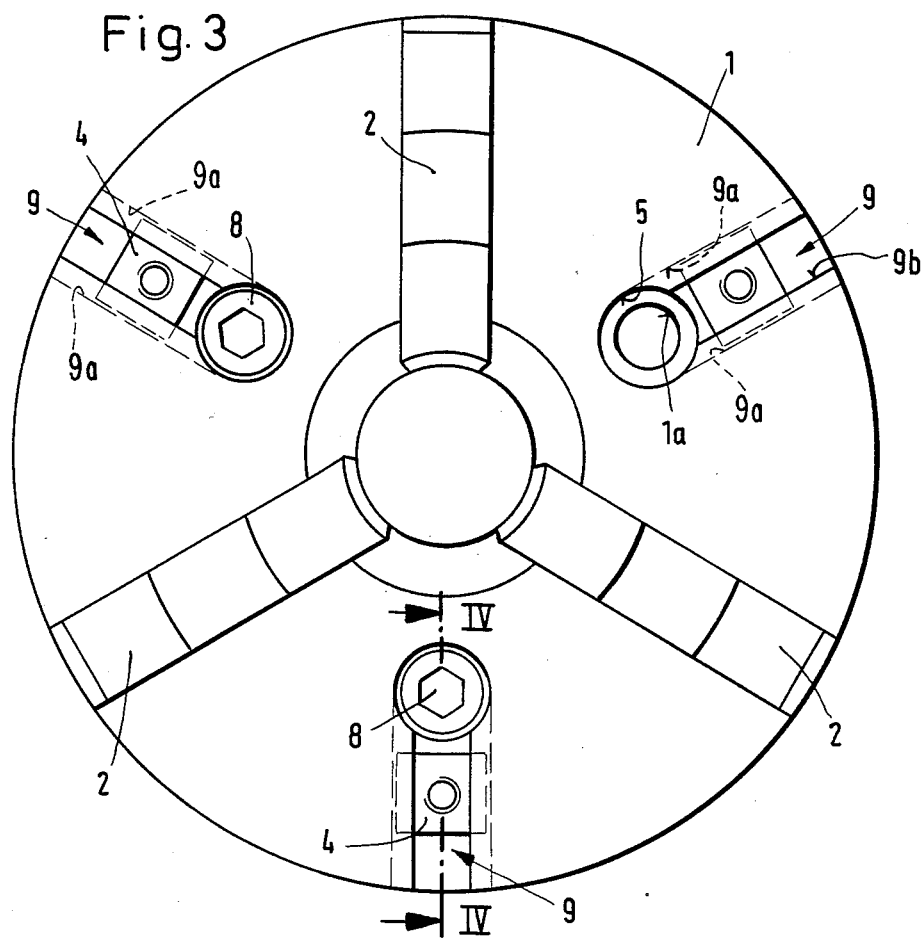
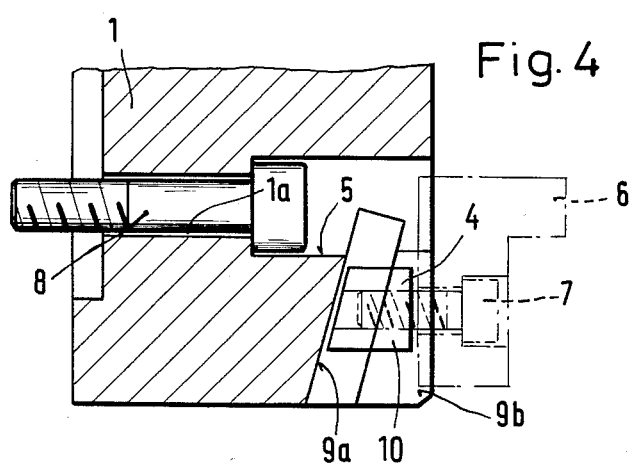

CHUCK

FIELD AND BACKGROUND OF THE INVENTION

The present invention relates to a chuck having T-slots, adapted to receive slot blocks for the fastening of stops or rests, on the body of the chuck or on base jaws guided for radial movement within the body of the chuck by at least one attachment screw which engages into a slot block.

In the known constructions, the blocks which are displaceable in the T-slots of either the chuck body or the clamping jaws, may be thrown out of the slots together with the stops or rests arranged on them, when the chuck is rotating if the attachment screws which engage into the slot blocks are not properly tightened, since the securing of the blocks in position in the T-slots is effected exclusively by force-locking by means of the attachment screws and there are no form-interlocking stops which prevent the emergence of the blocks out of the slots in radially outward direction. Thus in the known constructions it is left solely to the care exercised by the operator to prevent accidents of parts being thrown out of the chuck.

The object of the present invention is to guarantee, by simple structural means, in a chuck of the afore-mentioned type, that even if the attachment screws are not properly tightened the blocks cannot be thrown out of the T-slots of the chuck body or the clamping jaws.

SUMMARY OF THE INVENTION

This object is achieved by the invention in the manner that the T-slot is in a member comprising a clamping jaw, guidably mounted in the chuck body for radial movement with respect to the chuck body and at its radially inward end opens into a continuous bore having a diameter corresponding to the width of the slot at the base of the slot and that at least the base of the slot terminates at the radially outward end at a radial distance from the outer periphery of the member.

By this development of both the radially inward and the radially outward ends of the T-slot in accordance with the invention it is possible to introduce at least one slot block into the slot from the radially inward end, to which slot block (S) any desired stops or rests can be fastened, in each case by an attachment screw. Since at least the base of the slot at the radially outward end of the slot terminates at a radial distance from the outer periphery, the slot blocks are prevented by form-interlocking engagement formed by the shape of the parts themselves from being thrown out of the chuck or the clamping jaws upon the rotation of the chuck even if the attachment screws are excessively loose. In this way a considerable increase in the safety of the chuck of the invention is obtained, and this is accomplished with simple technical expense, and is independent of the care exercised by the operator.

In accordance with another feature of the invention, the radially outward end of the base of the slot is rounded with a radius which corresponds to that of the continuous bore so that a real application is obtained in the radially farthest outward end position of the slot block which has a circular cross section in the region of the base of the slot.

In one preferred embodiment, the continuous bore at the radially inward end can be formed simultaneously countersunk for the head of a chuck-fastening screw. As a result, the amount of work required can be reduced, although, it is of course also possible to form the bores for the chuck-fastening screws outside of the region of the T-slots in the body of the chuck.

In one alternative embodiment of the invention, in order to achieve the above-described object, the T-shaped slot is formed at an acute angle to the surface of the chuck. In this way there is automatically obtained a clamping between the chuck body or the clamping jaw on the one hand and the slot block which is connected by an attachment screw to the stop or rest on the other hand, since the depth of the slot from the face surface which increases in the radially outward direction, automatically leads to an increase in a force-interlocking (wedging) between the block and the slot the further the block is displaced radially outwardly by the rotating chuck. In one preferred embodiment, the slot has an angle of from 3° to 20°, preferably 5° to 10° to the surface.

In both possible embodiments of the invention the blocks are held securely in the chuck body or clamping jaws. While the first embodiment securely holds even individual blocks not provided with attachment screws and stops or rests, the second embodiment guarantees that blocks with attachment screws but which are not properly tightened are prevented against from being thrown off.

With the above and other objects and advantages in view, the present invention will become more clearly understood in connection with the detailed description of preferred embodiments, when considered with the accompanying drawings, of which:

BRIEF DESCRIPTION OF THE DRAWINGS

FIG. 3 is a front view of a second embodiment of a chuck in which the T-slots extend at an acute angle to the face surface of the chuck; and FIG. 4 is a partial section along the section line IV—IV of FIG. 3 through the second embodiment.

DETAILED DESCRIPTION OF THE PREFERRED EMBODIMENTS

Figure 1:
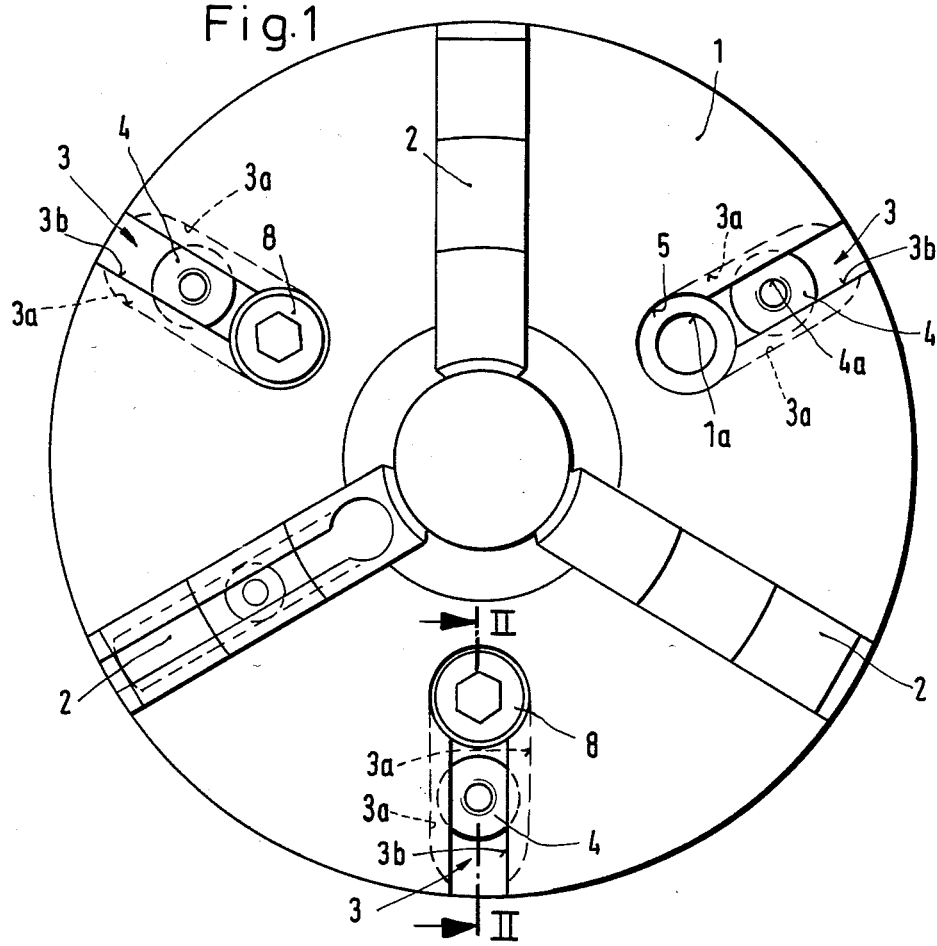
FIG. 1 is a front view of a chuck with T-slots, for the fastening of stops or rests, formed in the radial direction within the chuck body.
Figure 2:
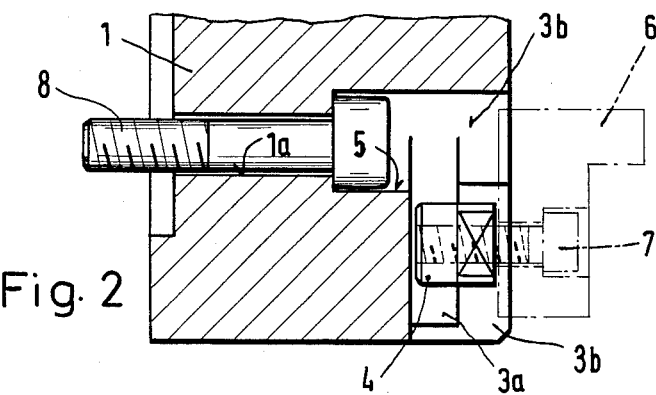
FIG. 2 is a partial section along the section line II—II through the chuck of FIG. 1.

FIGS. 1 and 2 show a chuck having a chuck body/in which clamping jaws 2 are radially moveably mounted. These clamping jaws 2 can be driven in any desired manner.

Between the clamping jaws 2 there are formed within the chuck body 1 radially directed slots 3 which are of T-shape in a cross section taken perpendicular to the line II—II such that the width between the slot base sides 3a (herein called the width of the base 3a) is greater than the width of the slot opening 3b at the surface of the body 1 of the chuck. These slots 3 serve to receive correspondingly T-shaped blocks 4 which are provided with a threaded bore 4a to receive attachment screws 7 by which stops 6 or rests can be fastened to the face of the chuck body 1.

In order to be able to insert the blocks 4 into the slots 3, each slot 3 passes at its radially inward end into a continuous bore 5 which has a diameter which corresponds to the width of the slot at its base sides 3a. This diameter is slightly greater than the outside diameter of the blocks 4, as can be noted from the right-hand part of FIG. 1.

On the radially outward end of the slot 3, at least the base sides 3a of the slot terminates at a radial distance from the outer periphery of the chuck body 1, as can be clearly noted from FIG. 1. The figures show that the radially outward ends of the base 3a of the slot are rounded with radii which corresponds to the radius of the bore 5. In this way the blocks 4 cannot emerge from the slots at the radially outward end, for instance if blocks 4 have been left by mistake in the slots or if the attachment screws for the or rests which engage into the blocks have not been properly tightened. This assurance against accidents, obtained by form interlocking engagement, is produced in a simple manner by not milling the base sides 3a of the slot all the way to the outer periphery of the body 1 of the chuck. Of course, it is also possible for the slot opening 3b not to be continued completely up to the outer periphery of the chuck body 1.

FIG. 2 shows in dash-dot line a stop 6 which is fastened by an attachment screw 7 through the block 4 to the face of the chuck body 1. There can also be noted in FIG. 2 a chuck-fastening screw 8 which is contained in a continuous bore 1a which is formed with a smaller diameter as an extension of the bore 5, the bore 5 by being deepened being used at the same time a countersink for the head of the chuck-fastening screw 8.

The second embodiment, contained in FIGS. 3 and 4, also shows a chuck body 1 which is provided with three clamping jaws 2 and within which radially extending slots 9 are formed between the clamping jaws 2. These slots 9 are also of T-shape in cross section, the base sides 9a of the slot terminating at the radially inward end in a bore 5, the diameter of which corresponds to the width between the base sides 9a of the slot and which is formed as a continuous bore 1a for the chuck-fastening screw 8.

Differing from the first embodiment, in the second embodiment shown in FIGS. 3 and 4 the base sides 9a of the slot do not extend parallel to the face surface of the chuck body 1 but are inclined at an acute angle to same between 30° to 20° and preferably 5° and 10° so that the depth of the slot 9 from the face surface of the chuck body 1 increases towards the outer periphery of the chuck body 1, as can be noted from FIG. 4. The block 10 is developed in a manner corresponding to this angular course of the T-slot 9, a stop 6 being again fastened to the block 10 by means of an attachment screw 7. In this embodiment the front surface of the block does not have to fit into the continuous bore 5 since the block before attaching the attachment screw can be inserted into the slot 3 from the periphery of the chuck.

Even in the event that the attachment screw 7 has not been properly tightened, the block 10 together with the stop 6 cannot be thrown out of the radially outward end of the slot 9 when the chuck body 1 is rotating since, due to the increasing depth of the slot 9, jamming takes place between the chuck body 1 on the one hand and the block 10 and the stop 6 on the other hand, this jamming being stronger the further the block 10 is displaced radially outwardly. In this way, insufficiently tightened stops 6 are prevented from being thrown out of the slots 9 as a result of centrifugal force.

Although in the embodiments described above the T-slots 3 and 9 are developed merely in the member comprising the chuck body 1, they can also be developed on the front surfaces of the clamping jaw 2 if additional stops or rests are to be fastened to these clamping jaws 2. The development and action of the slots 3 and 9 corresponds in both embodiments to what has been stated above.

Finally, it is also possible to develop the connection between the base and the top jaws also in the manner described by providing the base jaws on their front surface with T-slots 3 or 9 in which blocks 4 or 10 respectively are guided for the attachment of the top jaws.

We claim:

1. In a chuck having a T-slot which receives a slot block, the latter being adapted for fastening of a part on a member by at least one attachment screw which engages into the slot block, the member having a face surface and an outer periphery and having said T-slot therein, the improvement wherein
    said T-slot has a radially inward end and a radially outward end with respect to said outer periphery of said member, and a base with respect to the face surface of the member,
    said slot opens at said radially inward end into a continuous bore extending from the face surface of the member, said bore having a diameter substantially equal to the width of said slot at said base of said slot,
    at least said base of the slot at the radially outward end of the slot terminates at a radial distance from said outer periphery,
    the chuck has a chuck body, and
    said member is a clamping jaw, guidably mounted in the chuck body for radial movement with respect to the chuck body.

2. In a chuck having a T-slot which receives a slot block, the latter being adapted for fastening of parts on a member by at least one attachment screw which engages into the slot block, the member having a face surface and an outer periphery and having said T-slot therein, the improvement wherein
    said T-slot has a radially inward end and a radially outward end with respect to said outer periphery of said member, and a base with respect to the face surface of the member,
    said slot being formed at an acute angle relative to said face surface of said chuck and having a depth from said surface which increases in a radially outward direction toward said outer periphery,
    the chuck has a chuck body, and
    said member is a clamping jaw, guidably mounted in the chuck body for radial movement with respect to the chuck body.

* * * * *